US012560128B2

(12) United States Patent
Voit

(10) Patent No.: US 12,560,128 B2
(45) Date of Patent: Feb. 24, 2026

(54) OPERATION OF A GAS TURBINE TO LOWER LOAD AND MEL

(71) Applicant: Siemens Energy Global GmbH & Co. KG, Bayern (DE)

(72) Inventor: Kai Voit, Lutzelbach (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 18/853,876

(22) PCT Filed: Jan. 20, 2023

(86) PCT No.: PCT/EP2023/051425

§ 371 (c)(1),
(2) Date: Oct. 3, 2024

(87) PCT Pub. No.: WO2023/198329

PCT Pub. Date: Oct. 19, 2023

(65) Prior Publication Data

US 2025/0243818 A1 Jul. 31, 2025

(30) Foreign Application Priority Data

Apr. 11, 2022 (EP) .................................... 22167613

(51) Int. Cl.
*F02C 9/54* (2006.01)
(52) U.S. Cl.
CPC ............ *F02C 9/54* (2013.01); *F05D 2270/08* (2013.01); *F05D 2270/331* (2013.01)
(58) Field of Classification Search
CPC ................................... F01D 21/00; F02C 9/54
See application file for complete search history.

(56) References Cited

U.S. PATENT DOCUMENTS

| | | | |
|---|---|---|---|
| 8,826,670 | B2 | 9/2014 | Hoffmann |
| 2011/0265486 | A1 | 11/2011 | Plant |
| 2014/0331686 | A1 | 11/2014 | Gulen |
| 2017/0204771 | A1 * | 7/2017 | Zhang .................. F01N 11/002 |
| 2021/0148291 | A1 | 5/2021 | Yamamoto |

FOREIGN PATENT DOCUMENTS

| | | |
|---|---|---|
| WO | 2011152840 A1 | 12/2011 |
| WO | 2019164475 A1 | 8/2019 |

OTHER PUBLICATIONS

PCT International Search Report and Written Opinion of International Searching Authority mailed Apr. 14, 2023 corresponding to PCT International Application No. PCT/EP2023/051425 filed Jan. 20, 2023.

* cited by examiner

*Primary Examiner* — Scott J Walthour
(74) *Attorney, Agent, or Firm* — Wolter Van Dyke Davis, PLLC

(57) ABSTRACT

A method of operating a gas turbine, wherein a compressor for the gas turbine has adjustable guide vanes at the inlet of the compressor, wherein the compressed air by the compressor is mixed with fuel in order to burn the mixture inside a combustor, wherein the addition of fuel has a given fuel rate, wherein the gas tur is controlled from a high load to a given house load. At a first step the adjustable guide vanes are continuously closing and the fuel rate is also accordingly reduced and then in a second and final step starting at a turning point the adjustable guide vanes are not further closed, but the fuel rate is further reduced until the given house load is reached, so that a given exhaust flow is maintained.

13 Claims, 1 Drawing Sheet

OPERATION OF A GAS TURBINE TO LOWER LOAD AND MEL

CROSS REFERENCE TO RELATED APPLICATIONS

This application is the US National Stage of International Application No. PCT/EP2023/051425 filed 20 Jan. 2023, and claims the benefit thereof, which is incorporated by reference herein in its entirety. The International Application claims the benefit of European Application No. EP22167613 filed 11 Apr. 2022.

FIELD OF INVENTION

This idea relates to a method for operation of a gas turbine to stay emission compliant to and during low gas turbine load.

BACKGROUND OF INVENTION

Usually, a gas turbine (GT) is controlled from base load (BL) over part load (PL) to the MEL (Minimum Emission Compliant Load) by constantly closing the IGV (Adjustable Guide Vanes) and corresponding constant reduction of fuel or fuel rate to the combustion system of a GT leading to a reduction of turbine inlet temperature TIT. This curve is nearly linear since the IGV's are closed constantly and as the fuel is reduced, a reduction of turbine inlet temperature (TIT) is the consequence.

This is a common practice for ramping down a gas turbine (GT) emission compliant.

This has the advantage, that the combustion is very stable up to reaching the emission compliance of a single GT(s) or of a GT(s) in a combined cycle (CC).

Downstream of this point the GT or the plant is not emission compliant anymore up to house load (HL).

The emissions are mainly defined by below drivers:

(i) GT: The emission and load characteristics of the GT such as e.g., NOx, CO, etc.

(ii) optional catalyst section (SCR): the SCR reduces the emissions of the GT as per selected design and by the use of an ammonia slip which is guaranteed in many countries, too.

A malfunction of the SCR occurs especially at very low GT loads.

Accordingly, not only the GT exhaust gas characteristics are limiting the guaranteed emissions at exhaust stack outlet such as NOx, CO, Ammonia Slip, etc., but the SCR exhaust gas flow distribution at SCR inlet massively, too.

In addition, the experience for all OEM's at very low load (<50% CC load) is very limited, too.

Accordingly, even the GT could achieve lower MEL's, an optional SCR flow distribution would lead to a higher required MEL to ensure the emission guarantees.

The MEL gets more and more important for power plants. Power plants which can operate at very low MEL have the below advantages:

(i) since it enables the operators to avoid shutdowns of the plants (lifetime impact);

(ii) the operator can react on the grid very rapidly and do not have to consider slow start-up's;

(iii) can faster earn money by supporting the grid.

However, it is crucial to stay inside emission requirements of national authorities, which get more and more stringed due to the environmental commitments of the authorities and operator accordingly.

SUMMARY OF INVENTION

It is an aim of the invention to overcome the problems mentioned above.

The problem is solved by a method according to the independent claim.

In the dependent claims further advantages are listed which can be combined with each other arbitrarily to yield further advantages.

The invention improves the MEL point by keeping the emission compliance.

All power ranges of a GT in a single mode, especially with power ranges from 150MW to 600MW or more or less, and other GT's in plants with even smaller power output are suitable for this approach.

Especially, to avoid malfunction of an optional SCR, a certain exhaust flow is needed in front of the SCR to ensure a homogenous flow distribution and a good functionality of the SCR. This occurs especially at very low GT loads and exhaust flows.

BRIEF DESCRIPTION OF THE DRAWINGS

The FIGS. 1, 2 show the invention in correlation to the state of the art.

DETAILED DESCRIPTION OF INVENTION

A gas turbine GT can be operated in the single mode or be part of a combined cycle CC, wherein at least one heat recovery system (HRSG), at least one steam turbine is combined and with at least one GT.

The gas turbine GT has an exhaust gas path, which can have especially a catalyst section SCR.

The air from outside is compressed by a compressor which has at its inlet adjustable guide vanes IGV, which can be opened and closed.

The compressed air is mixed with fuel and this resulting fuel/air mixture is burned in the combustor to yield hot gas.

Fuel is supplied with a given fuel rate at steady state.

This hot gas is expanded in the hot gas path and after that the exhaust gas is passing the exhaust gas path.

This invention relates to a method for operation of gas turbine GT to stay emission compliant during low gas turbine load especially with a catalyst downstream in a heat recovery steam generator (HRSG) or bypass stack in a combined- or simple cycle power plant.

The gas turbine GT comprises a compressor having adjustable guide vanes (IGV) and the gas turbine power can also be controlled by closing/opening these guide vanes and controlling the fuel rate to the combustion system and turbine internal combustion temperature accordingly.

When the gas turbine is in operation between emission compliant load "MEL" and base load, the guide vanes are closing and the fuel flow or fuel rate is adjusted to reduce the gas turbine GT and combined cycle load and power accordingly to an emission-compliant load point.

FIG. 1 shows a diagram wherein the load of a GT in percent [%] is shown in dependency of the exhaust flow f of the gas turbine GT given in kg/s.

The gas turbine GT is operated at baseload (BL) wherein the IGV is fully opened or almost opened.

To ramp down the GT from BL in a first step, the IGV are preferably constantly closed which also reduces the load of the gas turbine GT and reduces the exhaust flow f, too.

The fuel rate is also preferably constantly reduced, especially linearly reduced.

This is known from the state of the art.

Ramping down the GT can also occur from a load lower than baseload BL.

But by our invention in a second step at a given turning point TP closing of the IGV is stopped before they are totally closed, especially they are still at least 10% open of the angular open range, but the fuel rate is further decreased until the house load HL is reached.

This is indicated by the line from TP to HL, which is parallel to the y-axis (load [%]).

The state of the art is shown by the dashed line after TP which is a prolongation of the line from BL until TP.

In FIG. 2 the dependency of the load [%] in dependency of the turbine inlet temperature (TIT) is shown. The dashed line shows again the state of the art.

At the turning point TP the IGV's are not further closed but the fuel rate is further decreased (HFR). The TIT is further reduced as a result.

The reduction of the fuel rate during the first step (until TP) has a first reduction rate (reduction of fuel rate by time), wherein the reduction rate during the second step (after TP) can have especially a second reduction rate, which is at least 10% higher than the first reduction rate (not shown).

The turning point (TP) is defined by the given house load (HL) of the GT or CC in percent plus a difference D, which is at least 5% until 20%, e.g., given house load is 36% BL and IGV are not closed anymore at 44% house load (HL), e.g., D=8%.

MEL is expected for GT in CC wherein emissions are e.g.:

2 mg/Nm$^3$ ammonia slip over whole operation range (MEL to BL)

NOx 10 mg/Nm$^3$

CO 10 mg/Nm$^3$.

A MEL of 50% CC load as bases of the emission requirements and the required exhaust flow at the SCR are achieved.

However, by applying the described operation the CC MEL can be reduced by keeping emissions.

Considering typical 1MW is equal to 350t€ each 1% MEL improvement would lead to an advantage in operation costs.

The invention claimed is:

1. A method of operating a gas turbine in a combined cycle power plant, wherein a compressor for the gas turbine has adjustable guide vanes at an inlet of the compressor, wherein compressed air by the compressor is mixed with fuel for combustion inside a combustor, wherein an addition of fuel has a given fuel rate at steady state of the gas turbine, wherein the gas turbine is controlled from a full load or from a base load, down to a given house load, the method comprising:

in a first step, closing the adjustable guide vanes continuously and reducing the fuel rate, and in a second step starting at a turning point, halting the closing of the adjustable guide vanes at the turning point and reducing the fuel rate further after halting the closing of the adjustable guide vanes until the given house load is reached, so that a given exhaust flow is maintained, wherein the turning point is at a given load, which is defined by the given house load in percent plus a difference in percent, wherein the difference is 5% up to 20%.

2. The method according to claim 1, further comprising operating the gas turbine in a single cycle operation.

3. The method according to claim 1, further comprising operating the gas turbine in a combined cycle operation.

4. The method according to claim 1, wherein the gas turbine has an exhaust gas path, the exhaust path comprising a catalyst.

5. The method according to claim 4, wherein the turning point is defined by a catalyst exhaust gas distribution, and wherein an emission compliant load is maintained.

6. The method according to claim 1, wherein the fuel rate is reduced linearly over time.

7. The method according to claim 1, wherein at the turning point the adjustable guide vanes are still at least 10% open of an angular open range of the adjustable guide vanes.

8. The method according to claim 1, wherein the reducing of the fuel rate during the first step has a first reduction rate of the fuel rate, and wherein a reduction rate during the second step after the turning point is a second reduction rate which is at least 10% higher than the first reduction rate.

9. The method according to claim 1, wherein in the first step the adjustable guide vanes are closed at a constant rate.

10. The method according to claim 1, wherein in the first step the fuel rate is reduced at a constant rate.

11. The method according to claim 1, wherein in the second step the fuel rate is reduced at a constant rate.

12. The method according to claim 1, wherein the second step is a final step.

13. A method of operating a gas turbine in a combined cycle power plant, wherein a compressor for the gas turbine has adjustable guide vanes at an inlet of the compressor, wherein compressed air by the compressor is mixed with fuel for combustion inside a combustor, wherein an addition of fuel has a given fuel rate at steady state of the gas turbine, wherein the gas turbine is controlled from a full load or from a base load, down to a given house load, the method comprising:

closing the adjustable guide vanes continuously while simultaneously reducing the fuel rate continuously in a first step at a first fuel reduction rate, the first fuel reduction rate being constant throughout the entire first step; and holding the adjustable guide vanes in a fixed position while constantly reducing the fuel rate during a second step at a second fuel reduction rate, wherein the second fuel reduction rate is constant throughout the entire second step, the second step occurring immediately after the first step, wherein the second fuel reduction rate is at least 10% greater than the first fuel reduction rate.

* * * * *